United States Patent
Kaito (10) Patent No.: US 8,795,908 B2
(45) Date of Patent: Aug. 5, 2014

(54) FUEL CELL SYSTEM

(75) Inventor: Takahiro Kaito, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1207 days.

(21) Appl. No.: 12/096,144

(22) PCT Filed: Jan. 22, 2007

(86) PCT No.: PCT/IB2007/000146
§ 371 (c)(1),
(2), (4) Date: Jun. 4, 2008

(87) PCT Pub. No.: WO2007/083235
PCT Pub. Date: Jul. 26, 2007

(65) Prior Publication Data
US 2008/0311449 A1    Dec. 18, 2008

(30) Foreign Application Priority Data
Jan. 23, 2006    (JP) ................. 2006-013834

(51) Int. Cl.
*H01M 8/06* (2006.01)
*H01M 8/04* (2006.01)

(52) U.S. Cl.
CPC ............ *H01M 8/04* (2013.01); *H01M 8/04365* (2013.01); *H01M 8/04492* (2013.01); *H01M 8/04559* (2013.01); *H01M 8/04753* (2013.01); *H01M 8/04552* (2013.01); *Y02E 60/50* (2013.01)
USPC ............................. 429/413; 429/400; 429/408

(58) Field of Classification Search
CPC ..................... H01M 8/04365; H01M 8/04492; H01M 8/04559; H01M 8/04753; H01M 8/04552; Y02E 60/50
USPC .................................... 429/22, 400, 408, 413
See application file for complete search history.

(56) References Cited

U.S. PATENT DOCUMENTS

| | | |
|---|---|---|
| 5,170,124 A | 12/1992 | Blair et al. |
| 2002/0034669 A1 | 3/2002 | Kobayashi et al. |
| 2002/0180448 A1 | 12/2002 | Imamura et al. |
| 2003/0066519 A1* | 4/2003 | Wachsman et al. ........... 123/703 |
| 2004/0033399 A1* | 2/2004 | Imamura et al. ............... 429/23 |

FOREIGN PATENT DOCUMENTS

| | | |
|---|---|---|
| DE | 102 27 272 A1 | 1/2004 |
| JP | 2006-4654 A | 1/2006 |
| JP | 2007-012429 A | 1/2007 |
| JP | 2007-012438 A | 1/2007 |

OTHER PUBLICATIONS

The extended European Search Report of corresponding European Patent Application No. 07700506.4-2119, dated Dec. 20, 2010.

* cited by examiner

*Primary Examiner* — Gary Harris
(74) *Attorney, Agent, or Firm* — Global IP Counselors, LLP (57) ABSTRACT

A fuel cell system has an oxidizer gas flow rate adjuster that adjusts a flow rate of oxidizer gas of the fuel cell stack and a controller that determines a humidity state in the fuel cell stack. The controller has an average cell voltage calculator that calculates an average cell voltage, a minimum cell voltage calculator that calculates a minimum cell value, a voltage difference calculator that calculates a voltage difference between the average cell voltage and the minimum cell voltage, and a voltage comparator that compares the absolute voltage difference with a preset value. The flow rate of the oxidizer gas is changed based on a comparison between the absolute voltage difference and the preset value, and then the humidity state in the fuel cell stack is determined based on a change in the absolute voltage difference.

15 Claims, 7 Drawing Sheets

FUEL CELL SYSTEM

CROSS-REFERENCE TO RELATED APPLICATIONS

This U.S. National stage application claims priority to Japanese Patent Application No. 2006-013834, filed on Jan. 23, 2006. The entire disclosure of Japanese Patent Application No. 2006-013834 is hereby incorporated herein by reference.

BACKGROUND OF THE INVENTION

1. Field of the Invention

The present invention generally relates to a fuel cell system. More specifically, the present invention relates to a method and apparatus used for determining a humidity state in a fuel cell.

2. Background Information

A fuel cell is an electrochemical device that employs an electrochemical reaction between hydrogen and oxygen to generate electric energy or power. In the fuel system, output from the cell decreases due to an insufficient supply of gas, poor power generation caused by drops of liquid resident in a channel, and reduced electric conductivity caused by dryness in an electrolyte. When the fuel cell is operated under such conditions, a problem arises in that deterioration of the cell is accelerated. Therefore, the humidity state in the fuel cell must be determined in order to resolve the abovementioned problem.

In Japanese Laid-Open Patent Application No. 2004-127915, a method is disclosed for determining the humidity state. In this publication, excessive humidity is presumed when an average cell voltage is within a first predetermined range and a cell block exists where the output voltage is outside a second predetermined range. Insufficient humidity is presumed when the average cell voltage is outside the first predetermined range and voltage variance is within a third predetermined range. An insufficiency of fuel gas is presumed when the voltage variance is outside the third predetermined range.

In Japanese Laid-Open Patent Application No. 2002-184438, a technique is disclosed wherein the position in a stack occupied by a unit cell whose voltage has decreased is determined. If the unit cell is positioned near an end, then the stack is determined to be in an excessively humid state, whereas if the unit cell is positioned near the middle, the stack is determined to be in an insufficiently humid state.

In Japanese Laid-Open Patent Application No. 9-245826, a method is disclosed wherein the humidity state is determined by storing beforehand in a storage device a pattern of changes in voltage over time for a cell block that comprises one or more unit cells, measuring the pattern of changes in voltage over time for each unit cell or cell block, and comparing the resulting voltage pattern and the stored pattern.

In Japanese Laid-Open Patent Application No. 2005-228688, voltages are measured for each of a plurality of unit cell. If the minimum unit cell voltage exceeds a first predetermined value when a factor influencing the load or the wetted state changes, the fuel cell is determined to be wet, and the result of the determination takes effect if the voltage falls below a second predetermined value if the factor affecting wetness is still changing or has finished changing.

SUMMARY OF THE INVENTION

However, it has been discovered that in Japanese Laid-Open Patent Application No. 2004-127915, it is impossible to distinguish between instances where the cell voltage has decreased due to water accumulating in the channels within the cell (excessive humidity) and variations occurring in the gas distribution, and instances where the reaction efficiency and the output of the cell decease due to drying of the cell interior (insufficient humidity) and the electrolyte membrane.

In Japanese Laid-Open Patent Application No. 2002-184438, the humidity state is determined based on the position of the cell whose voltage has decreased, with the end of the stack being excessively humid because the cell temperature is low and moisture does not readily evaporate, but the center of the stack being insufficiently humid because the cell temperature is high and moisture readily evaporates. However, in actual use, the end of the stack may be insufficiently humid or the center of the stack may be excessively humid, so that the state of humidity does not depend on the position of the cell in the stack. The risk arises that an erroneous determination will therefore be given.

Furthermore, in Japanese Laid-Open Patent Application Nos. 9-245826 and 2005-228688 as well, it is impossible to distinguish between instances in which the voltage of the cell decreases due to water collecting in the channels in the cell (excessive humidity) and variations occurring in the gas distribution, and instances wherein the reaction efficiency and the cell output decrease due to drying of the interior of the cell (insufficient humidity) and the electrolyte membrane.

In accordance with one aspect of the present invention, a fuel cell humidity determining method is provided that basically comprises determining an absolute voltage difference between an average cell voltage for a plurality of individual cells of a fuel cell stack and a minimum cell value for a voltage output by the individual cells, comparing the absolute voltage difference with a first preset value, changing a flow rate of an oxidizer gas based on a comparison between the absolute voltage difference and the first preset value, and determining a humidity state in the fuel cell stack based on a change in the absolute voltage difference after the flow rate of the oxidizer gas has been changed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. Embodiments of the present invention shall be described hereunder with reference to the drawings. In the descriptions of the drawings, the same or similar parts are designated by the same or similar symbols.

First Embodiment

Figure 1:
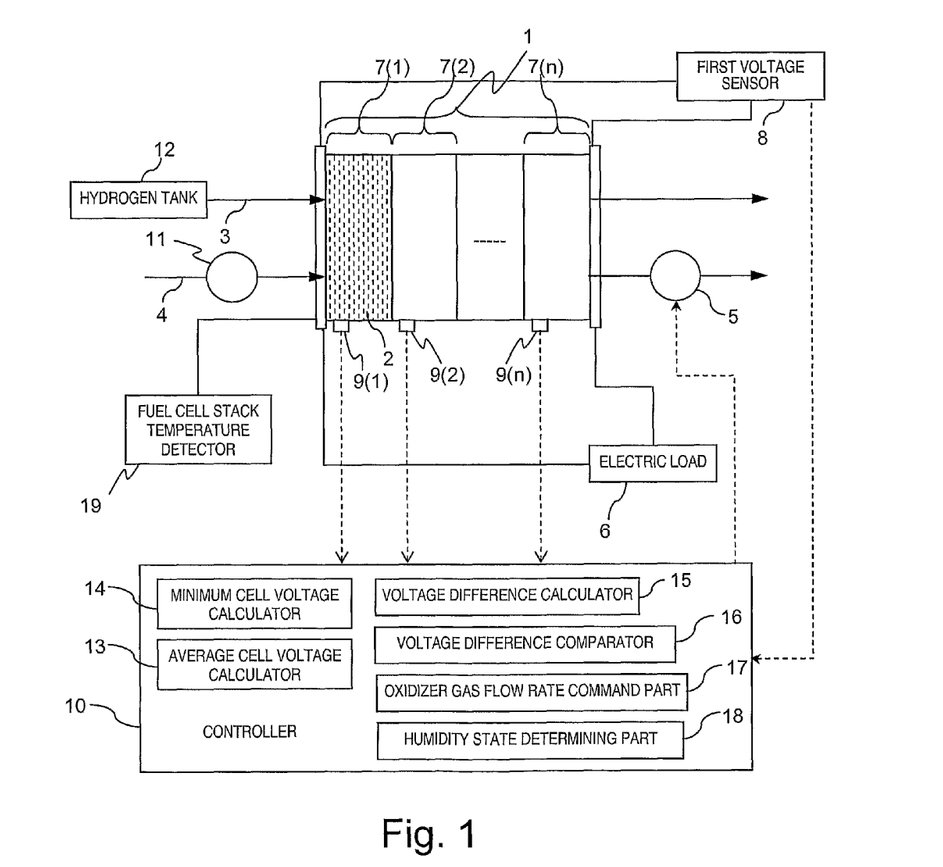
FIG. 1 is a schematic block diagram showing an overall configuration of a fuel cell system according to a first embodiment of the present invention.

Referring initially to FIG. 1, a fuel cell system is illustrated in accordance with a first embodiment of the present invention. The fuel cell system of this embodiment basically includes a fuel cell stack 1 having unit from a plurality of cells 2, a fuel gas (hydrogen) channel 3, an oxidizer gas (air) channel 4, an oxidizer gas flow rate adjuster 5, an electric load 6, a first voltage sensor 8, a plurality of second voltage sensors 9(1) through 9(n), a controller 10, a compressor 11 and a hydrogen tank 12. The fuel cell stack 1 is configured to generate electrical power by employing an electrical chemical reaction between hydrogen and oxygen. The fuel gas (hydrogen) channel 3 is connected to an anode side of the fuel cell stack 1. The oxidizer gas (air) channel 4 is connected to a cathode side of the fuel cell stack 1. The compressor 11 and the oxidizer gas flow rate adjuster 5 are connected to the oxidizer gas channel 4. The hydrogen tank 12 is connected to the fuel gas channel 3. The electric load 6 is connected to the fuel cell stack 1.

The unit cells 2 are electrically connected in series and from a plurality of cell blocks 7. The unit cells 2 have an electrode pair in which a solid electrolyte membrane, which is an electrolyte, is sandwiched between an anode and a cathode. The first voltage sensor 8 is configured and arranged to measure the voltage generated by the fuel cell stack 1 (referred to hereunder as "the total fuel cell voltage of the fuel cell"). The second voltage sensors 9(1) through 9(n) are configured and arranged to measure voltages $V_{CB}(1)$ through $V_{CB}(n)$ for each of the cell blocks 7(1) though 7(n). The value of the constant n corresponds to the number of the cell blocks 7 contained in the fuel cell stack 1. For example, the constant n is set to 50 in one embodiment of the present invention, where the fuel cell stack 1 has fifty of the cell blocks 7.

The hydrogen tank 12 is connected to the fuel cell tank 1 via the fuel gas channel 3, and stores, at a high pressure, hydrogen that is fed to the fuel cell stack 1. The hydrogen gas stored in the hydrogen tank 12 is depressurized by a hydrogen pressure adjustment valve (not shown) to a hydrogen pressure required by the fuel cell stack 1.

The compressor 11 is connected to the fuel cell stack 1 via the oxidizer gas channel 4. The compressor 11 compresses air and then feeds the air to the oxidizer gas channel 4.

The oxidizer gas flow rate adjuster 5 is connected to the fuel cell stack 1 via the oxidizer gas channel 4, and changes the flow rate of the oxidizer gas in accordance with commands from the controller 10. For example, a valve (throttle) whose aperture is adjusted to enable the flow rate of a gaseous body to be controlled can be used as the oxidizer gas flow rate adjuster 5.

The controller 10 receives a voltage signal from the first voltage sensor 8 and second voltage sensor 9, and then outputs a control signal to the oxidizer gas flow rate adjuster 5 on the basis of the result of a calculation. The controller 10 comprises an average cell voltage calculator 13, a minimum cell voltage calculator 14, an absolute voltage difference calculator 15, a voltage difference comparator 16, an oxidizer gas flow rate command part 17, and a humidity state determining part 18.

Figure 2:
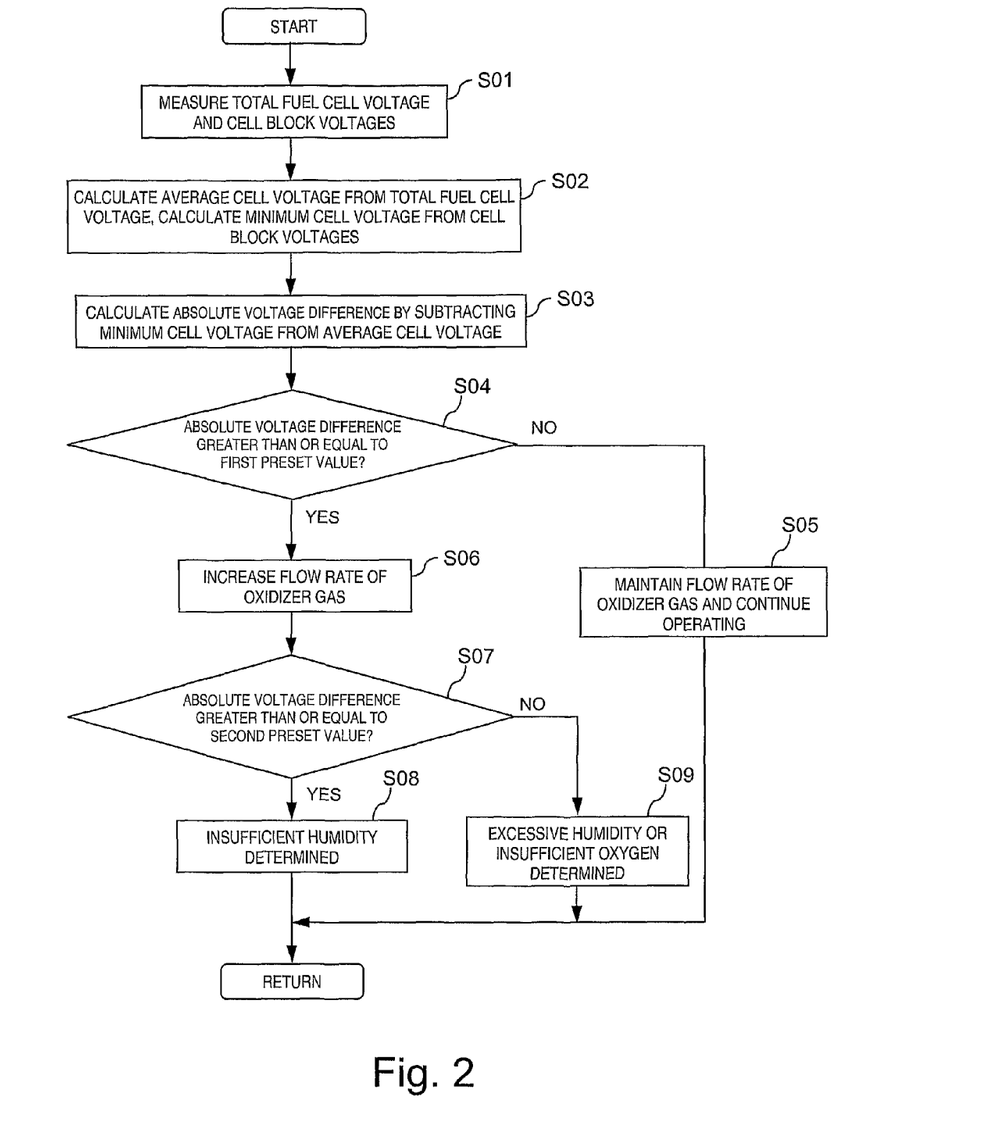
FIG. 2 is a flowchart showing the method for determining a humidity state in a fuel cell stack according to the first embodiment of the present invention.

An operation of a fuel cell system obtained in the above-mentioned configuration, i.e., a method for determining a humidity state of a fuel cell according to an embodiment of the present invention, shall next be described using the flowchart of FIG. 2.

First, in step S01, a total fuel cell voltage $V_T$ is detected by the first voltage sensor 8, while the cell block voltages $V_{CB}(1)$ through $V_C(n)$ are detected by the second voltage sensors 9(1) through 9(n).

Next, in step S02, the average cell voltage calculator 13 determines the average cell voltage $V_A$ by dividing the total fuel cell voltage $V_T$ by the total number of cells constituting the fuel cell stack (referred to hereunder as "the total number of cells N") as indicated in formula (1). The minimum cell voltage calculator 14 calculates the cell voltages $V_C(1)$ through $V_C(n)$ indicated by formula (2) for each of the cell blocks 7(1) through 7(n) by using the cell block voltage $V_{CB}$ and average cell voltage $V_A$, with n' being the number of cells constituting the cell block 7, and sets the minimum value among the results of calculating $V_C(1)$ through $V_C(n)$ as the minimum cell voltage $V_{min}$.

$$\text{Average cell voltage } (V_A) = V_T/N \quad (1)$$

$$\text{Cell voltage } V_C(n) = V_{CB}(n) - (n'-1) \times V_A \quad (2)$$

In step S03, the absolute voltage difference calculator 15 calculates the absolute voltage difference between the average cell voltage $V_A$ and minimum cell voltage $V_{min}$ obtained in step S02, e.g., obtaining the absolute voltage difference by subtracting the minimum cell voltage $V_{min}$ from the average cell voltage $V_A$. Alternatively, instead of calculating the average cell voltage $V_A$ and minimum cell voltage $V_{min}$, the absolute voltage difference can be determining using a digital circuit that produces voltage deviations that are indicative of the difference between the average cell voltage $V_A$ and minimum cell voltage $V_{min}$. Thus, these voltage deviations can constitute the absolute voltage difference.

In step S04, the absolute voltage difference comparator 16 compares the absolute voltage difference calculated in step S03 with a first preset value. Therefore, the absolute voltage difference always has a positive value, for which reason the first preset value and the below described preset values are set as absolute or positive values. When the absolute voltage difference obtained by subtracting the minimum cell voltage $V_{min}$ from the average cell voltage $V_A$ from is less than the first preset value (NO in step S04), the process then proceeds to step S05 and the fuel cell continues to operate with the flow rate of the oxidizer gas being maintained.

On the other hand, in step S04, when the absolute voltage difference obtained by subtracting the minimum cell voltage $V_{min}$ from the average cell voltage $V_A$ is greater than or equal to the first preset value (YES in step S04), the process proceeds to step S06. In step S06, the oxidizer gas flow rate command part 17 transmits a control signal to the oxidizer gas flow rate adjuster 5 to increase the flow rate of the oxidizer gas.

Once the flow rate of the oxidizer gas has been increased in step S06, then in step S07, the absolute voltage difference comparator 16 further draws a comparison between a second preset value, which is greater than or equal to the first preset value, and the absolute voltage difference obtained by subtracting the minimum cell voltage $V_{min}$ from the average cell voltage $V_A$. Then the process proceeds to step S09 when the absolute voltage difference obtained by subtracting the minimum cell voltage $V_{min}$ from the average cell voltage $V_A$ is less than the second preset value (NO in step S07). Therefore, an increase is made in the flow rate of the oxidizer gas, which is an action for making the fuel cell stack 1 less humid, whereby the minimum cell voltage $V_{min}$ accordingly returns to the average cell voltage $V_A$. As a result, the humidity state determining part 18 determines that the fuel cell stack 1 is in an excessively humid state, which is a state other than an insufficiently humid state. In such instances, the excessively humid state is eliminated by further increasing the flow rate of the oxidizer gas and dispersing the water resident in the fuel cell stack 1, or another corresponding action is performed.

On the other hand, when the results of the voltage comparison in step S07 indicate that the absolute voltage difference obtained by subtracting the minimum cell voltage $V_{min}$ from the average cell voltage $V_A$ has been further reduced by the increase in the flow rate of the oxidizer gas, and is greater than or equal to the second preset value (YES in step S07), the process proceeds to step S08. In this case, the humidity state determining part 18 determines that the fuel cell stack 1 is insufficiently humid because the minimum cell voltage $V_{min}$ is not returned to the average cell voltage $V_A$ by the increase in the flow rate of the oxidizer gas, which is an action for making the fuel cell stack 1 less humid. In this instance, the flow rate of the oxidizer gas is reduced so that the water resident in the fuel cell stack 1 increases, or another corresponding action is performed.

The first preset value in the present invention can be set to an absolute voltage value that can be obtained when the fuel cell is running in an optimal state and that is higher than the maximum absolute value of the absolute voltage difference obtained by subtracting the minimum cell voltage $V_{min}$ from the average cell voltage $V_A$. The absolute value is more preferably set with consideration given to variation among the cells. For example, an absolute value of $|-0.15|$ V to $|-0.05|$ V is preferably set as the first preset value.

When the fuel cell stack 1 is insufficiently humid, the cell voltage decreases. Thus, the absolute cell voltage increase further from the first preset value, and a sudden decline in voltage occurs in some insufficiently humid states. Therefore, the absolute voltage difference (e.g., that is obtained by subtracting the minimum cell voltage $V_{min}$ from the average cell voltage $V_A$ and that existed during insufficiently humid state but before the sudden decline in the voltage occurs) is preferably determined through experimentation. Then, a value lower than the experimental value for this absolute voltage difference during insufficiently humid is preferably set as the second preset value. For example, an absolute value of $|-0.3|$ V to $|-0.2|$ V is preferably set as the second preset value for determining insufficiently humid state. In the present invention, the first preset value and the second preset value can also be the same.

According to the present embodiment, once the flow rate of the oxidizer gas has been increased, the absolute voltage difference obtained by subtracting the minimum cell voltage $V_{min}$ from the average cell voltage $V_A$ and a preset value are compared, whereby instances of the fuel stack being insufficiently humid can be determined without erroneous readings.

Figure 3:
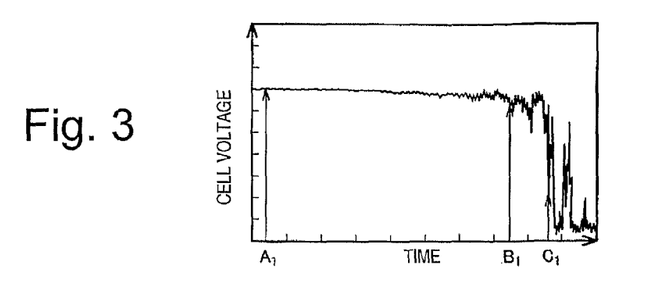
FIG. 3 is a graph showing a voltage waveform when the humidity state is changed by reducing the flow rate of an oxidizer gas.
Figure 4:
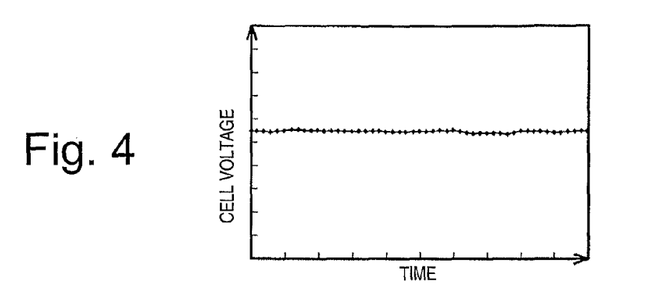
FIG. 4 is an enlarged portion of the graph in FIG. 3 showing the voltage waveform at time $A_1$ (stable operation) in FIG. 3.
Figure 5:
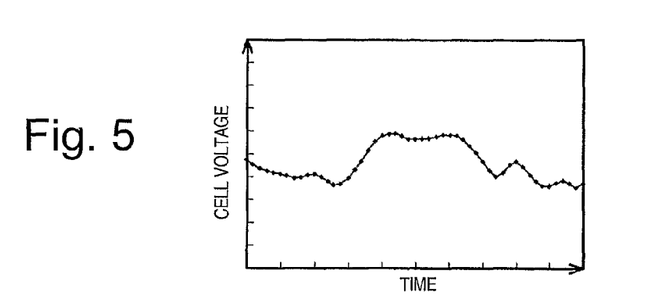
FIG. 5 is an enlarged portion of the graph in FIG. 3 showing the voltage waveform at time $B_1$ (excessive humidity) in FIG. 3.
Figure 6:
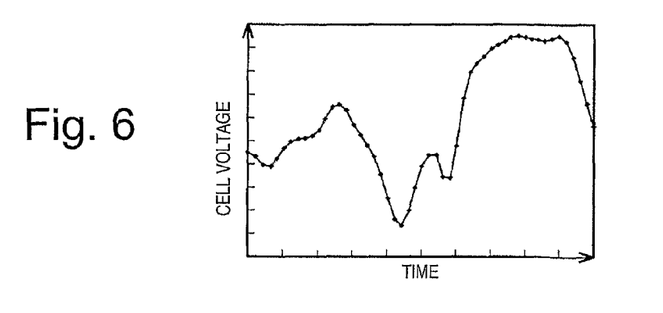
FIG. 6 is an enlarged portion of the graph in FIG. 3 showing the voltage waveform at time $C_1$ (insufficient oxygen) in FIG. 3.
Figure 7:
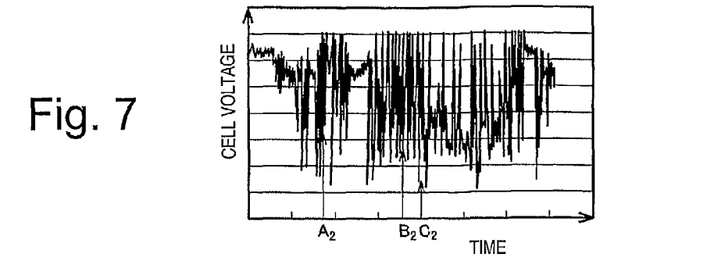
FIG. 7 is a graph showing the change in a minimum cell voltage over time when the fuel cell is in operation (traveling on a congested road)
Figure 8:
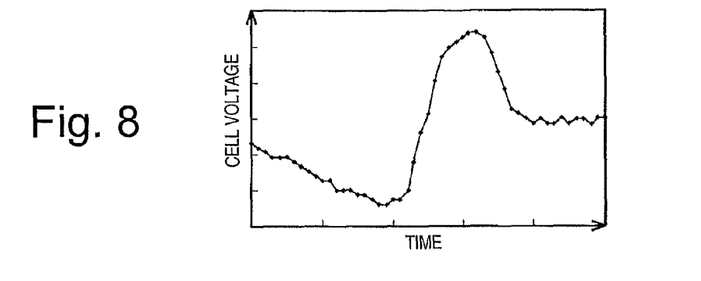
FIG. 8 is an enlarged portion of the graph in FIG. 7 showing the change in a minimum cell voltage over time when the fuel cell is in operation (traveling on a congested road) at time $A_2$ in FIG. 7.
Figure 9:
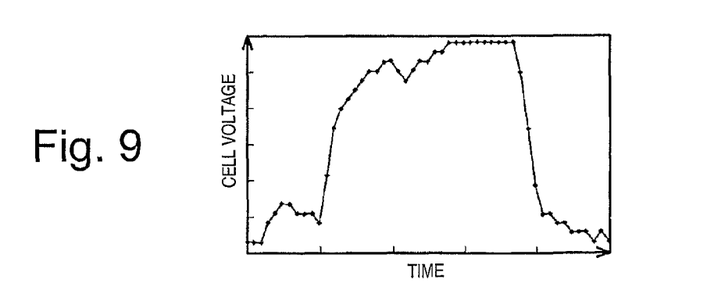
FIG. 9 is an enlarged portion of the graph in FIG. 7 showing the change in a minimum cell voltage over time when the fuel cell is in operation (traveling on a congested road) at time $B_2$ in FIG. 7.
Figure 10:
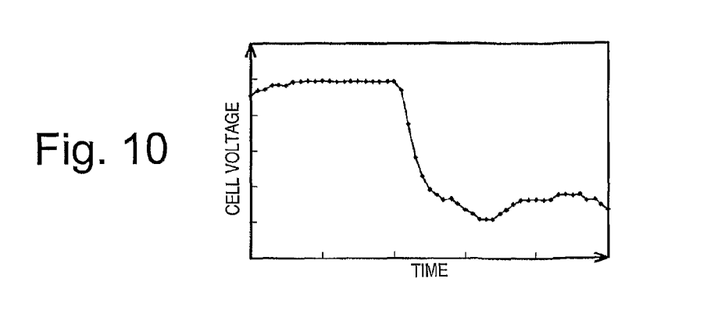
FIG. 10 is an enlarged portion of the graph in FIG. 7 showing the change in a minimum cell voltage over time when the fuel cell is in operation (traveling on a congested road) at time $C_2$ in FIG. 7.

In Japanese Laid-Open Patent Application No. 2004-127915, a method is disclosed whereby the operating state is determined by dividing a change of output voltage over time into a non-oscillatory component and an oscillatory component. FIG. 3 shows the results of measurements, actually made, of oscillations in the voltage of a unit cell when an excessively humid, oxygen-deficient state existed. An enlarged view of the voltage at time $A_1$ at which the humidity state in the unit cell was not irregular (stable state) is shown in FIG. 4. An enlarged view of the voltage at time $B_1$ at which an excessively humid state was present is shown in FIG. 5. An enlarged view of the voltage at time $C_1$ at which an oxygen-deficient state was present is shown in FIG. 6. FIG. 7 shows the results of measurements of oscillations in the unit-cell voltage during actual operation (traveling on a congested road) when excessive humidity and no oxygen deficiency was present. Expanded views of a portion where the voltage is oscillating (times $A_2$, $B_2$, and $C_2$) in FIG. 7 are shown in FIGS. 8 to 10.

It can be understood from FIG. 4 that the cell voltage will not oscillate as long as the unit cell is in a stable state. However, it can be understood from FIG. 7 that when the fuel cell is in an operating state, the unit cell voltage will oscillate even in instances where no irregularities are present in the humidity state. Therefore, if a comparison is made between FIGS. 8 to 10, which are the expanded views at each time, and FIGS. 5 and 6, which show results of voltage measurements that were made when irregularities were actually present in the humidity state, no distinction can be made because no significant differences in the waveforms can be seen.

Therefore, in Japanese Laid-Open Patent Application No. 2004-127915, even if no irregularity in the state of humidity has occurred, a decision that an irregularity has occurred may be made because the output voltage of the cell will oscillate if the fuel cell is in an operating state. However, in the present embodiment, a comparison is made between the first preset value and the absolute voltage difference, which is not readily affected by the oscillation of the output voltage of the unit cell, and is obtained by subtracting the minimum cell voltage $V_{min}$ from the average cell voltage $V_A$. Instances where irregularities in the humidity state occur can therefore be accurately determined even when the fuel cell is in an operating state.

Once the flow rate of the oxidizer gas is increased as an action for making the fuel cell stack 1 insufficiently humid, a comparison is made between the absolute voltage difference obtained by subtracting the minimum cell voltage $V_{min}$ from the average cell voltage $V_A$, and the second preset value, which is less than the absolute voltage difference for determining insufficiently humid state before the voltage suddenly decreases due to insufficient humidity. The fuel cell stack 1 can accordingly be determined to be in an insufficiently humid state or another state (excessively humid, oxygen deficient). Specifically, if the humidity state of the fuel cell stack 1 is not restored by raising the flow rate of the oxidizer gas, and the absolute voltage difference further increases to be greater than or equal to the second preset value, it can be surmised that the fuel cell stack 1 was originally in a state of insufficient humidity. Alternatively, if the absolute voltage difference is returned by raising the oxidizer gas flow rate, it can be surmised that the fuel cell stack is in a state other than insufficient humidity.

A decision is made in step S04 whether to change the flow rate of the oxidizer gas. The flow rate can be changed only when the absolute voltage difference obtained by subtracting the minimum cell voltage $V_{min}$ from the average cell voltage $V_A$ is greater than or equal to the first preset value for two or more times. Adopting such a configuration makes it possible to execute the method for determining the humidity state according to the present embodiment only when an irregularity occurs in the humidity state of the fuel cell stack.

A decision in the affirmative regarding the humidity state in steps S08 and S09 can be made when a preset number of affirmative results have been arrived at based on the comparison between the first or second preset values and the absolute voltage difference measured a plurality of times within a prescribed time. For example, a decision in the affirmative can be made when the results of the measurements are in the affirmative five out of six times within a span of three seconds. The humidity state can be more accurately determined by employing such a configuration.

The degree to which the flow rate of the oxidizer gas is changed in step S06 can be such that the flow rate is reduced as the load current drawn from the fuel cell stack increases. Adopting such a configuration makes it possible to prevent the fuel cell stack from becoming dry when the load current is high; e.g., when the flow rate of the oxidizer gas is suddenly increased.

The average cell voltage $V_A$ in step S02 is determined by dividing the voltage of the fuel cell stack by the total number of cells constituting the fuel cell stack, as shown in formula (1). Measurement error is thereby reduced to a greater degree than when the total cell block voltage is divided by the total number of cells.

The minimum cell voltage $V_{min}$ in step S02 is calculated as shown in formula (2). An irregularity can accordingly be determined in the initial period of the change in the humidity state because the calculation will yield the amount of decrease in the unit cell voltage in a case in which all the cells in the cell block undergo a small decrease in voltage.

The cell block in the present embodiment may be composed of a unit cell or a plurality of cells. If the cell block is composed of a unit cell, the voltage of the entire cell is measured. Therefore, measurements of the voltage are precise and the humidity state can be accurately determined. Alternatively, if the cell block is composed of a plurality of cells, the configuration of the fuel cell system can be simplified.

Second Embodiment

In the first embodiment, the flow rate of the oxidizer gas is increased when the absolute voltage difference obtained by subtracting the minimum cell voltage $V_{min}$ from the average cell voltage $V_A$ has risen above the first preset value, and the humidity state of the fuel cell stack 1 is determined according to the change in the absolute voltage difference obtained by subtracting the minimum cell voltage $V_{min}$ from the average cell voltage $V_A$. In a second embodiment, the flow rate of the oxidizer gas is reduced when the absolute voltage difference has risen above the first preset value, and the humidity state is determined based on the change in the subsequent voltage.

The configuration of the fuel cell system according to the second embodiment is the same as in FIG. 1, and a drawing and description thereof have accordingly been omitted.

Figure 11:
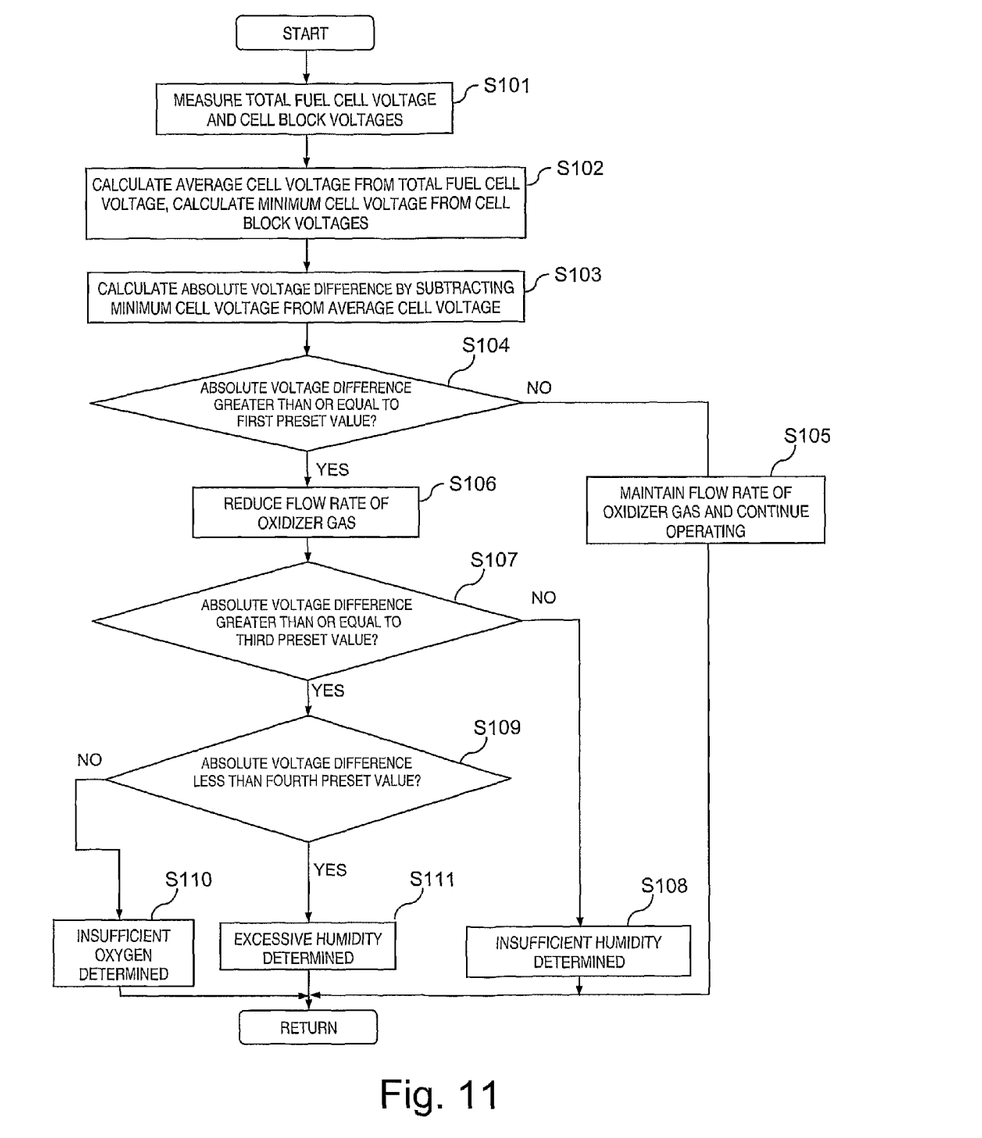
FIG. 11 is a flowchart of a process for determining a humidity state in a fuel cell stack according to a second embodiment of the present invention.

The method for determining the humidity state of a fuel cell stack according to the second embodiment shall be described using the flowchart of FIG. 11. The process from step S100 to step S104 is the same as that of step S01 to step S04 in FIG. 2.

In step S104, when the absolute voltage difference obtained by subtracting the minimum cell voltage $V_{min}$ from the average cell voltage $V_A$ is less than the first preset value (NO in step S104), the process proceeds to step S105, and the fuel cell stack continues to operate while the flow rate of the oxidizer gas is maintained.

In step S104, when the absolute voltage difference obtained by subtracting the minimum cell voltage $V_{min}$ from the average cell voltage $V_A$ is greater than or equal the first preset value (YES in step S104), the process proceeds to step S106, and the oxidizer gas flow rate command part 17 transmits a control signal to the oxidizer gas flow rate adjuster 5 to reduce the flow rate of the oxidizer gas.

Once the flow rate of the oxidizer gas has been reduced, in step S107 the absolute voltage difference comparator 16 compares the absolute voltage difference obtained by subtracting the minimum cell voltage $V_{min}$ from the average cell voltage $V_A$ and a third preset value, which is greater than or equal to the first preset value.

The process proceeds to step S108 when the absolute voltage difference obtained by subtracting the minimum cell voltage $V_{min}$ from the average cell voltage $V_A$ is less than the third preset value (NO in step S107). The humidity state determining part 18 determines the fuel cell stack 1 to be insufficiently humid from the fact that the minimum cell voltage $V_{min}$ returns to the average cell voltage $V_A$ due to the flow rate of the oxidizer gas being reduced, which is an action for making the fuel cell stack 1 excessively humid. In this instance, the flow rate of the oxidizer gas is further reduced so that the water resident in the fuel cell stack 1 increases, or another corresponding action is performed.

On the other hand, the process moves to step S109 when the absolute voltage difference decreases further due to the flow rate of the oxidizer gas being reduced in step S106, and the absolute voltage difference obtained by subtracting the minimum cell voltage $V_{min}$ from the average cell voltage $V_A$ is greater than or equal to the third preset value (YES in step S107). The absolute voltage difference comparator 16 further compares the absolute voltage difference obtained by subtracting the minimum cell voltage $V_{min}$ from the average cell voltage $V_A$ and a fourth preset value, which is greater than or equal to the third preset value.

The process proceeds to step S110 when the absolute voltage difference obtained by subtracting the minimum cell voltage $V_{min}$ from the average cell voltage $V_A$ is greater than or equal to the fourth preset value (NO in step S109). The humidity state determining part 18 determines that the fuel cell stack 1 is deficient in oxygen because, as a result of the flow rate of the oxidizer decreasing, the oxidation reaction is not adequately performed in the fuel cell stack 1, and the voltage decreases. In this case, for example, the flow rate of the oxidizer gas may be increased and the water resident in the fuel cell stack 1 dispersed to eliminate the excessively humid state or to perform another action.

On the other hand, when the absolute voltage difference obtained by subtracting the minimum cell voltage $V_{min}$ from the average cell voltage $V_A$ is less than the fourth preset value (YES in step S109), the process proceeds to step S111. The humidity state determining part 18 determines that the fuel cell stack 1 is excessively humid from the fact that the minimum cell voltage $V_{min}$ does not return to the average cell voltage $V_A$ due to the flow rate of the oxidizer gas being reduced, which is an operation for making the fuel cell stack 1 excessively humid, and the minimum cell voltage $V_{min}$ decreases further. In this case as well, for example, the flow rate of the oxidizer gas can be increased and the water resident in the fuel cell stack 1 dispersed to eliminate the excessively humid state or to perform another action. When the fuel cell stack 1 is determined to be deficient in oxygen with the excessive humidity being further advanced, the flow rate of the oxidizer gas may be increased to a greater degree than when the fuel cell stack is determined to be excessively humid.

The determination concerning the humidity state can be in the affirmative in steps S108, S110 and S111, if the result of the comparison between the absolute voltage difference obtained by subtracting the minimum cell voltage $V_{min}$ from the average cell voltage $V_A$ measured a plurality of times within a prescribed time frame and the first, third, or fourth preset value is affirmative over a preset number of times. For example, the determination may be in the affirmative when the results of the measurements are in the affirmative five out of six times within a span of three seconds.

When the fuel cell stack 1 becomes excessively humid, the cell voltage falls. Thus, the absolute cell voltage falls further below the first preset value, and a sudden drop in voltage occurs in some excessively humid states. Therefore, the absolute voltage difference (e.g., that existed during the excessively humid state but prior to the sudden drop in voltage and that is obtained by subtracting the minimum cell voltage $V_{min}$ from the average cell voltage $V_A$) is preferably obtained by experimentation. Then, a value lower than the experimental value for this absolute voltage difference during excessively humid is preferably set as the third preset value. The first and third preset values may also be the same in the present invention. For example, an absolute value of |−0.3| V to |−0.2| V is preferably set as the third preset value.

When the flow rate of the oxidizer gas is reduced, the reaction between the reaction gasses will not occur in the fuel cell stack 1 due to a lack of the oxygen contained in the oxidizer gas, and the voltage may decrease dramatically. Therefore, the absolute voltage difference (e.g., that existed during the insufficient oxygen state but prior to the dramatic decrease in voltage and that is obtained by subtracting the minimum cell voltage $V_{min}$ from the average cell voltage $V_A$) is preferably obtained through experimentation. Then, a value lower than the experimental value for the absolute voltage difference during the insufficient oxygen is set as the fourth preset value. For example, an absolute value of |−0.5| V to |−0.3| V is preferably set as the fourth preset value.

According to the second embodiment, once the flow rate of the oxidizer gas has been reduced, the third preset value and the absolute voltage difference obtained by subtracting the minimum cell voltage $V_{min}$ from the average cell voltage $V_A$ are compared, whereby the fuel cell stack 1 can be determined to be insufficiently humid from the fact that the minimum cell voltage $V_{min}$ is returned to the average cell voltage $V_A$ by a reduction in the flow rate of the oxidizer gas, which is an operation for making the fuel cell stack 1 excessively humid.

Furthermore, reducing the flow rate of the oxidizer gas, which is an action for making the fuel cell stack 1 excessively humid, may cause the absolute voltage difference obtained by subtracting the minimum cell voltage $V_{min}$ from the average cell voltage $V_A$ to be greater than or equal to the third preset value and to be greater than or equal to the fourth preset value, which are used to determine that the power-generating reaction has not proceeded due to an oxygen deficiency and the voltage has decreased. At this time, it is possible to determine that the fuel cell stack 1 is deficient in oxygen. In addition, when the absolute voltage difference obtained by subtracting the minimum cell voltage $V_{min}$ from the average cell voltage $V_A$ is greater than or equal to the third preset value and is less than the fourth preset value, which determines that the power-generating reaction has not proceeded due to insufficient oxygen and a decline in the voltage has occurred, it will be thought that an excessively humidified state rather than an oxygen-deficient state will be established and the voltage will decrease. The fuel cell stack 1 can then be determined to be excessively humid.

Figure 12:
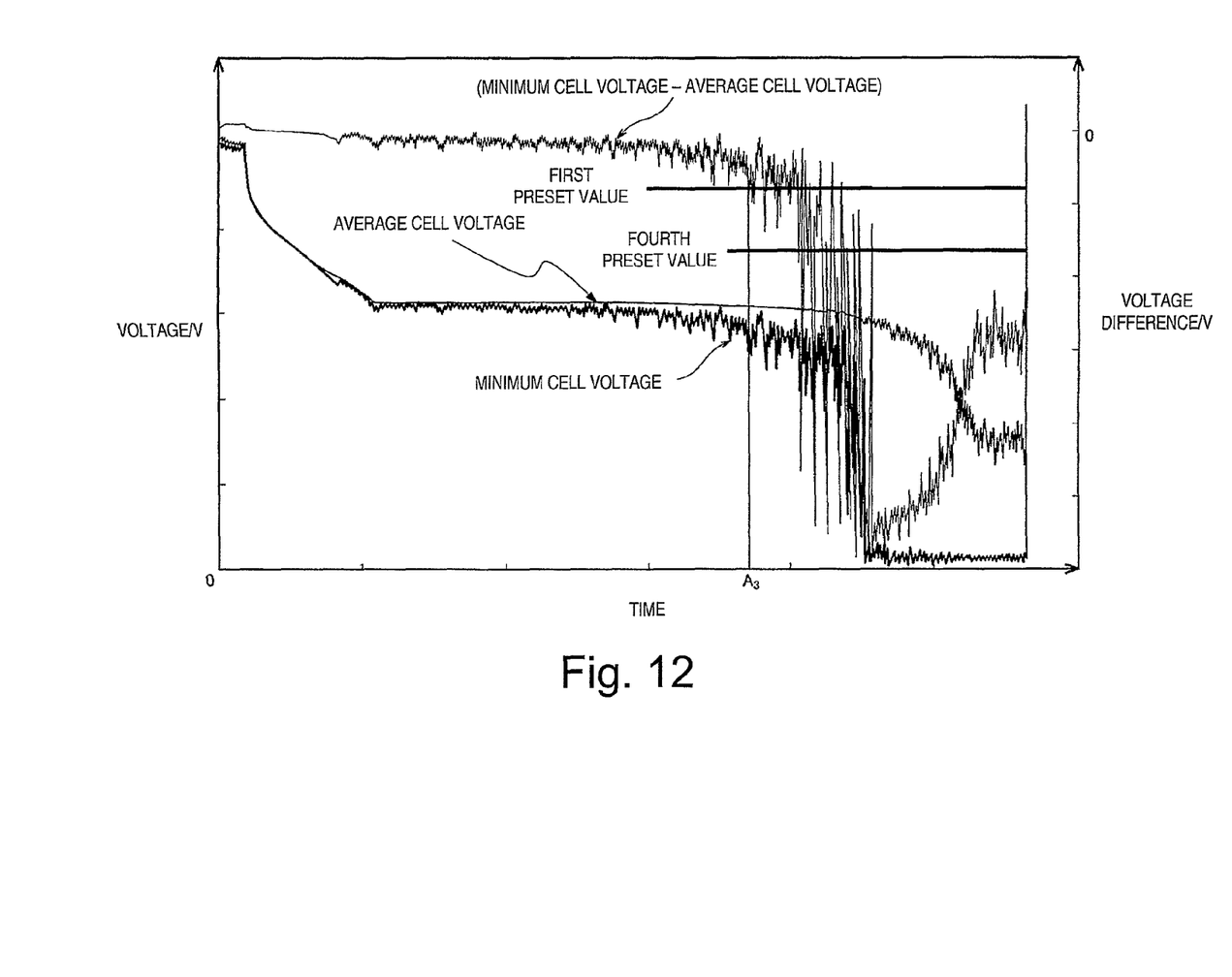
FIG. 12 is a graph showing an example of actual measurements of a difference between a minimum cell voltage and an average cell voltage $V_A$ in the method for determining a humidity state according to the second embodiment of the present invention.

For example, FIG. 12 shows results of measurements of the absolute voltage difference obtained by subtracting the minimum cell voltage $V_{min}$ from the average cell voltage $V_A$. The measurements were taken in cases in which the flow rate of the oxidizer gas had actually been reduced when the absolute voltage difference obtained by subtracting the minimum cell voltage $V_{min}$ from the average cell voltage $V_A$ was greater than the first value. In FIG. 12, the first and third preset values are the same. The vertical axis (average cell voltage $V_A$–minimum cell voltage $V_{min}$) is on the right side (voltage difference/V), and the absolute numerical values increase in the downward direction. The vertical axes "average cell voltage $V_A$" and "minimum cell voltage $V_{min}$" are on the left side (voltage/V), and the numerical values increase in the upward direction.

In FIG. 12, at time $A_3$, the absolute voltage difference obtained by subtracting the average cell voltage $V_A$ from minimum cell voltage $V_{min}$ is greater than the first preset value, and the flow rate of the oxidizer gas therefore begins to be reduced. As a result, the absolute voltage difference obtained by subtracting the average cell voltage $V_A$ from minimum cell voltage $V_{min}$ is further increased, and the first preset value consequently will not be greater than the fourth preset value. Therefore, in this instance, the fuel cell stack is determined to be deficient in oxygen.

Third Embodiment

Figure 13:
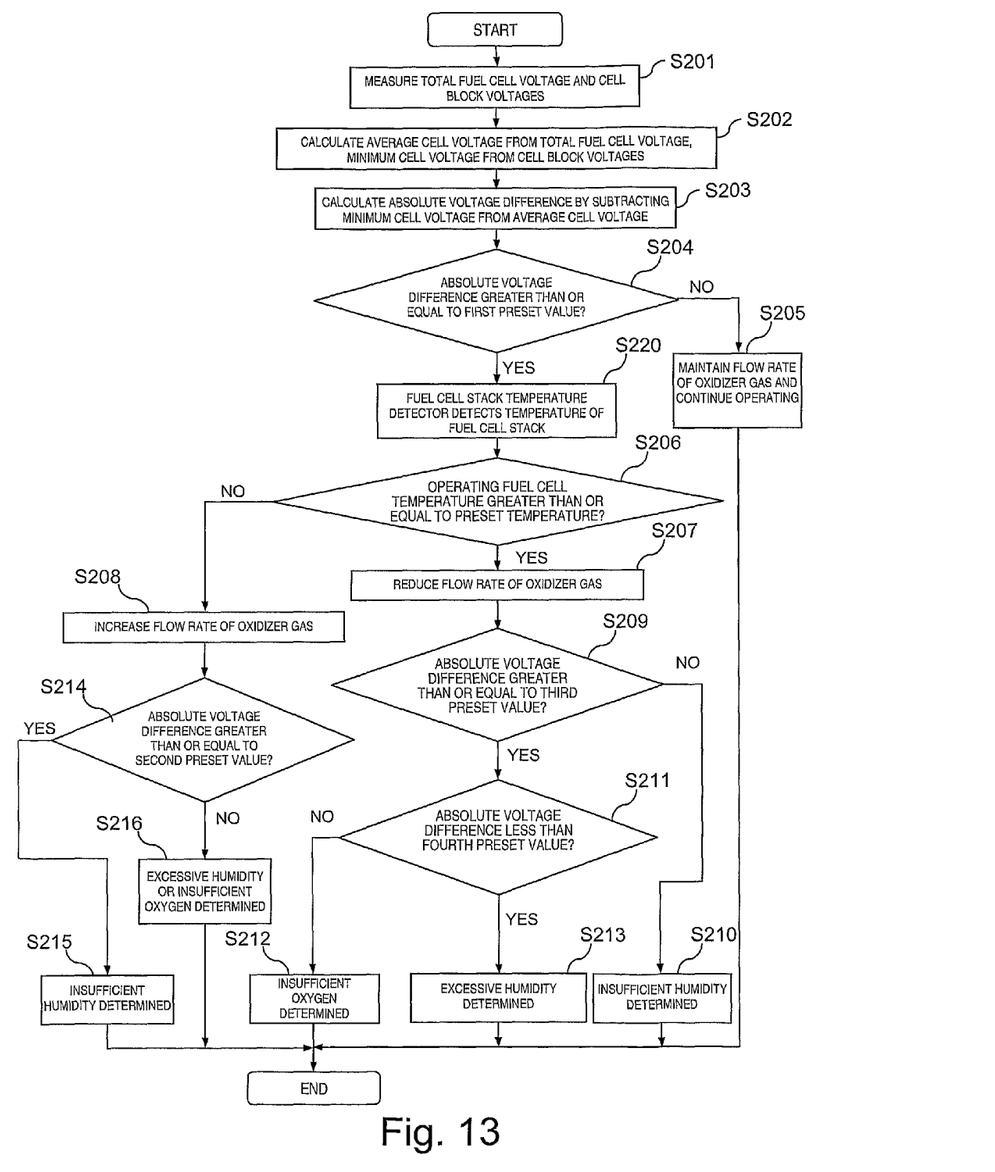
FIG. 13 is a flowchart showing the method for determining a humidity state in a fuel cell stack according to a third embodiment of the present invention.

A method for determining the humidity state of a fuel cell stack according to a third embodiment of the present invention shall be described using the flowchart of FIG. 13. In the fuel cell system according to the third embodiment of the present invention, a fuel cell stack temperature detector 19 is added to the fuel cell system according to the first embodiment (see FIG. 1). The fuel cell stack temperature detector 19 is provided with a function for detecting the temperature of the fuel cell stack 1. A temperature sensor thermally connected to the fuel cell stack 1, for example, corresponds to such a device.

In this third embodiment of the present invention, steps S201 to S204 are the same as steps S01 to S04 in FIG. 2, and steps S101 to S104 in FIG. 11.

In the third embodiment of the present invention, in step S204, the process proceeds to step S220 once the absolute voltage difference obtained by subtracting the minimum cell voltage $V_{min}$ from the average cell voltage $V_A$ is determined to be greater than or equal to the first preset value (NO in step S204). The process proceeds to step S206 once the fuel cell stack temperature detector 19 detects the temperature of the fuel cell stack. If the absolute voltage difference obtained by subtracting the minimum cell voltage $V_{min}$ from the average cell voltage $V_A$ is less than the first preset value (YES in step S204), the process moves to step S205, and the fuel cell stack continues to operate while the flow rate of the oxidizer gas is maintained.

The amount of saturated water vapor increases quadratically in accordance with an increase in the temperature of a gas. Accordingly, insufficient humidity tends to occur as the temperature of the fuel cell stack 1 increases. On the other hand, excessive humidity more readily occurs as the temperature of the fuel cell stack 1 decreases. Therefore, when the temperature of the fuel cell stack 1 is greater than or equal to a preset temperature (YES in step S206), it is likely that the fuel cell stack 1 is insufficiently humid and the voltage has decreased. The oxidizer gas flow rate command part 17 accordingly transmits a control signal to the oxidizer gas flow rate adjuster 5 to reduce the flow rate of the oxidizer gas (step S207). Steps S209 to S213, which occur after the flow rate of the oxidizer gas has been reduced, proceed in the same manner as steps S107 to S111 in FIG. 11.

On the other hand, in step S206, if the temperature of the fuel cell stack 1 is less than the preset temperature (NO in step S206), it is likely that the fuel cell stack 1 is excessively humid and the voltage has decreased. The oxidizer gas flow rate command part 17 therefore transmits a control signal to the oxidizer gas flow rate adjuster 5 to increase the flow rate of the oxidizer gas (step S208). The process following the increase in the flow rate of the oxidizer gas is the same as steps S07 to S09 in FIG. 2.

In the third embodiment, the direction of change in the flow rate of the oxidizer gas is determined according to the temperature of the fuel cell stack 1. If the temperature of the fuel cell stack 1 is greater than or equal to the preset temperature, the humidity is likely to be deficient. Therefore, the flow rate of the oxidizer gas is reduced, thereby allowing the fuel cell stack to be kept from becoming insufficiently humid. On the other hand, if the temperature of the fuel cell stack 1 is less than the preset temperature, the humidity is likely to be excessive. Therefore, the flow rate of the oxidizer gas is increased, thereby allowing the fuel cell to be kept from becoming excessively humid.

The present invention was described above according to first through third embodiments and modifications thereof. However, it should be understood that the statements and drawings constituting a part of this disclosure do not limit the invention. Various alternative modes, examples, and applicable techniques shall be apparent to those skilled in the art based on this disclosure. In other words, it should be understood that the present invention includes various embodiments and the like not disclosed herein. Therefore, the present invention is limited only by items specifically attributed to the invention according to the appropriate claims from this disclosure.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell humidity determining method comprising:
    determining an absolute voltage difference between an average cell voltage for a plurality of individual cells of a fuel cell stack and a minimum cell voltage value for a voltage output by the individual cells;
    comparing the absolute voltage difference with a first preset value;
    selectively changing a flow rate of an oxidizer gas to change humidity in the fuel cell based on a comparison between the absolute voltage difference and the first preset value, the changing the flow rate of the oxidizer gas based on the comparison between the absolute voltage difference and the first preset value being prohibited when the absolute voltage difference is less than the first preset value so that the flow rate of the oxidizer gas is maintained, and the changing the flow rate of the oxidizer gas based on the comparison between the absolute voltage difference and the first preset value occurring when the absolute voltage difference greater than or equal the first preset value;
    determining a humidity state in the fuel cell stack based on a change in the absolute voltage difference due to the change in the humidity in the fuel cell after the flow rate of the oxidizer gas has been changed, such that a change in the humidity state indicates whether the fuel cell is becoming excessively humid or insufficiently humid depending on the change in the flow rate of the oxidizer gas, wherein in the excessive humidity state, the flow rate of the oxidizer gas is increased and liquid in the fuel cell is dispersed; and at least one of the following:
comparing the absolute voltage difference with a second preset value, which is greater than or equal to the first preset value, after the flow rate of the oxidizer gas has been increased, and determining the humidity state in the fuel cell stack being in an insufficiently humid state when the absolute voltage difference is greater than or equal to the second preset value; and comparing the absolute voltage difference with the second preset value after the flow rate of the oxidizer gas has been increased, and determining the humidity state in the fuel cell stack being either in an excessive humid state or in an insufficient oxygen state when the absolute voltage difference is less than the second preset value.

2. The fuel cell humidity determining method according to claim 1, wherein
the changing the flow rate of the oxidizer gas based on the comparison between the absolute voltage difference and the first preset value entails reducing the flow rate of the oxidizer gas; and further comprising
comparing the absolute voltage difference with a third preset value, which is less than or equal to the first preset value, after the flow rate of the oxidizer gas has been reduced, and determining the humidity state in the fuel cell stack being in an excessively humid state when the absolute voltage difference is greater than or equal to the third preset value.

3. The fuel cell humidity determining method according to claim 2, further comprising
determining insufficient oxygen in the fuel cell stack when the absolute voltage difference is greater than or equal to a fourth preset value, which is greater than or equal to the third preset value.

4. The fuel cell humidity determining method according to claim 1, wherein
the changing the flow rate of the oxidizer gas based on the comparison between the absolute voltage difference and the first preset value entails reducing the flow rate of the oxidizer gas; and further comprising
comparing the absolute voltage difference with a third preset value, which is less than or equal to the first preset value, after the flow rate of the oxidizer gas has been reduced, and determining the humidity state in the fuel cell stack being in an insufficient humid state when the absolute voltage difference is less than the third preset value.

5. The fuel cell humidity determining method according to claim 1, further comprising
measuring a temperature of the fuel cell stack before the changing of the flow rate of the oxidizer gas;
increasing the flow rate of the oxidizer gas when the temperature is less than a preset temperature; and
reducing the flow rate of the oxidizer gas when the temperature is greater than or equal to the preset temperature.

6. The fuel cell humidity determining method according to claim 1, wherein
the changing the flow rate of the oxidizer gas based on the comparison between the absolute voltage difference and the first preset value entails changing the flow rate of the oxidizer gas only when the absolute voltage difference that is obtained as a result of the comparing of the absolute voltage difference with the first preset value is less than the first preset value for at least two times that the comparing is performed.

7. The fuel cell humidity determining method according to claim 1, wherein
the determining of the humidity state of the fuel cell stack based on the change in the absolute voltage difference entails measuring the absolute voltage difference at at least two instances after the flow rate of the oxidizer gas has been changed, and further determining the humidity state of the fuel cell stack when the absolute voltage differences are identical at least twice.

8. The fuel cell humidity determining method according to claim 1, wherein
the change of the flow rate of the oxidizer gas decreases as a load current drawn from the fuel cell stack increases.

9. The fuel cell humidity determining method according to claim 1, wherein
the determining of the absolute voltage difference is accomplished by calculating the average cell voltage for the individual cells of the fuel cell stack, and calculating the minimum cell voltage value for the voltage output by the individual cells.

10. The fuel cell humidity determining method according to claim 9, wherein
the determining of the average cell voltage is determined by dividing a voltage of the fuel cell stack by a total number of the cells forming the fuel cell stack.

11. The fuel cell humidity determining method according to claim 9, wherein
the determining of the minimum cell voltage value is obtained using a formula $$F=C-(D-1)\times E$$

where F is the minimum value of cell voltage calculated from a voltage C of a cell block in which the fuel cell stack is divided into an arbitrary number of the individual cells with an average cell voltage E, and a number of cells D that form the cell block.

12. The fuel cell humidity determining method according to claim 11, wherein
the cell block is composed of one of the individual cells.

13. The fuel cell humidity determining method according to claim 11, wherein
the cell block is composed of a plurality of the individual cells.

14. A fuel cell system comprising:
an oxidizer gas flow rate adjuster configured to adjust a flow rate of an oxidizer gas of a fuel cell stack; and
a controller operatively coupled to the oxidizer gas flow rate adjuster to control the oxidizer gas flow rate adjuster, the controller including a voltage comparator configured to compare an absolute voltage difference between an average cell voltage for a plurality of individual cells of a fuel cell stack and a minimum cell voltage value for a voltage output by the individual cells with a first preset value,
the controller being configured to selectively instruct the oxidizer gas flow rate adjuster to change the flow rate of the oxidizer gas to change humidity in the fuel cell based on a comparison between the absolute voltage difference and the first preset value,
the controller being further configured to determine a humidity state in the fuel cell stack based on a change in the absolute voltage difference due to the change in the humidity in the fuel cell after the flow rate of the oxidizer gas has been changed, such that a change in the humidity state indicates whether the fuel cell is becoming excessively humid or insufficiently humid depending on the change in the flow rate of the oxidizer gas, wherein in the excessive humidity state, the flow rate of the oxidizer gas is increased and liquid in the fuel cell is dispersed; and
the controller being further configured to perform at least one of the following operations:
compare the absolute voltage difference with a second preset value, which is greater than or equal to the first preset value, after the flow rate of the oxidizer gas has been increased, and determine the humidity state in the fuel cell stack being in an insufficiently humid state when the absolute voltage difference is greater than or equal to the second preset value; and
compare the absolute voltage difference with the second preset value after the flow rate of the oxidizer gas has been increased, and determine the humidity state in the fuel cell stack being either in an excessive humid state or in an insufficient oxygen state when the absolute voltage difference is less than the second preset value.

15. The fuel cell system according to claim 14, wherein the controller further includes
an average cell voltage calculator configured to calculate the average cell voltage for the plurality of individual cells of the fuel cell stack;
a minimum cell voltage calculator configured to calculate the minimum cell voltage value for the voltage output by the individual cell; and
a voltage difference calculator configured to calculate the absolute voltage difference between the average cell voltage and the minimum cell voltage value.

* * * * *